July 11, 1950  S. VELOTTA  2,514,593
EDGER
Filed March 24, 1947  3 Sheets-Sheet 1

Inventor
Salvatore Velotta

E. V. Hardaway
Attorney

July 11, 1950  S. VELOTTA  2,514,593
EDGER
Filed March 24, 1947  3 Sheets-Sheet 3
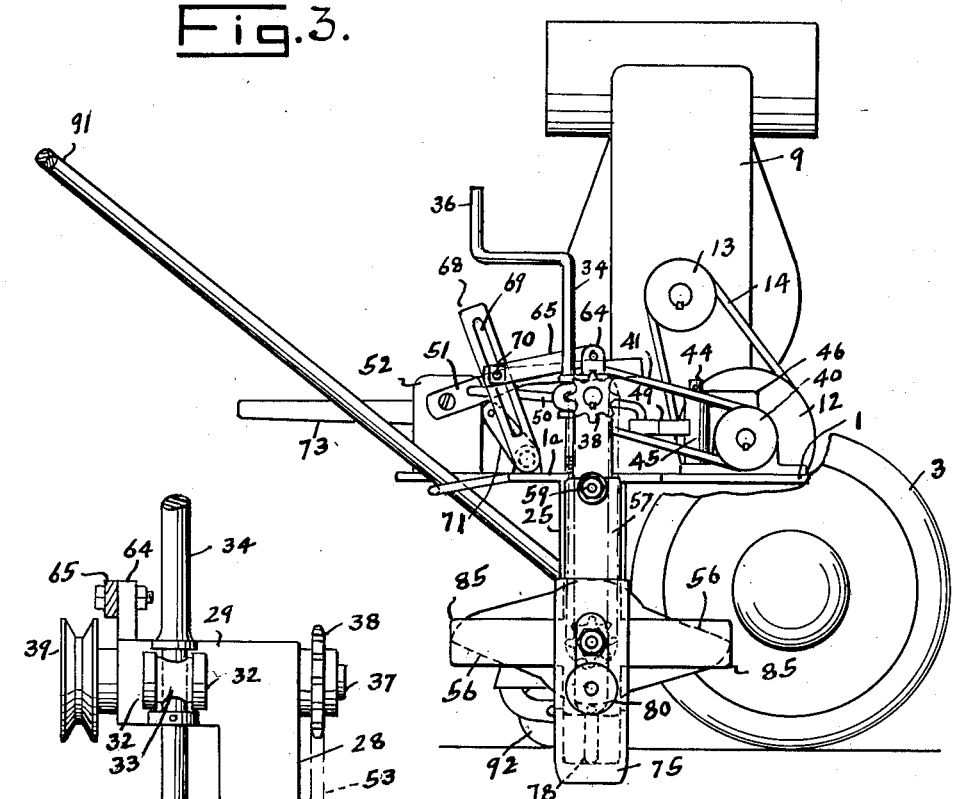
Fig.3.
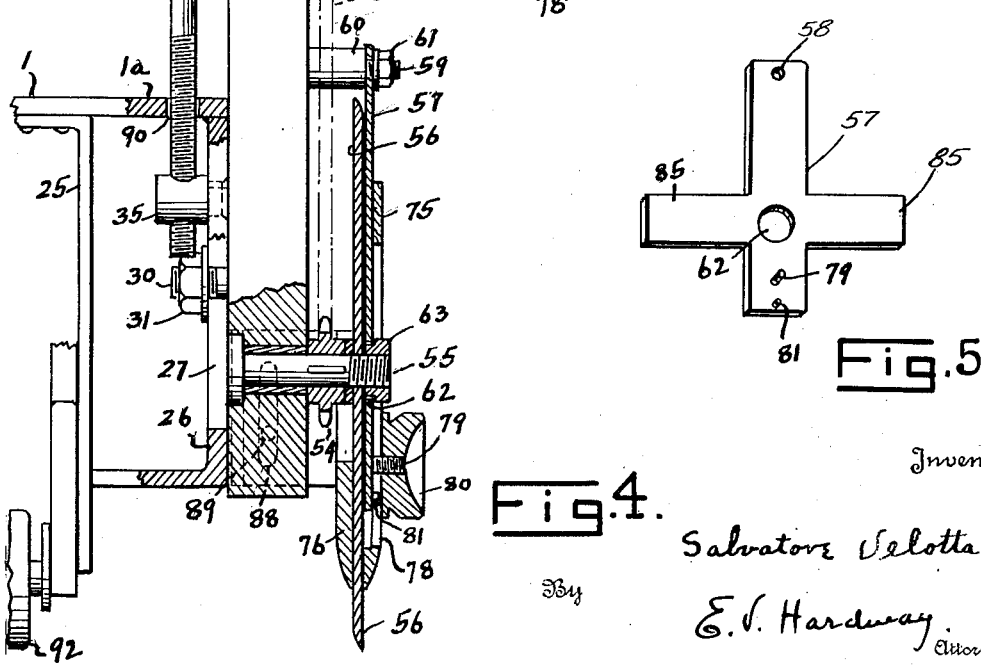
Fig.4.
Fig.5.
Inventor
Salvatore Velotta
E. V. Hardway
Attorney Patented July 11, 1950

2,514,593

UNITED STATES PATENT OFFICE 2,514,593

EDGER

Salvatore Velotta, Houston, Tex.

Application March 24, 1947, Serial No. 736,653

12 Claims. (Cl. 56—251)

This invention relates to an edger.

An object of the invention is to provide an attachment for grass cutters, particularly lawn mowers, whereby the lawn may be edged.

The attachment is specially applicable for edging curbs and walks.

It is a further object of the invention to provide an edging attachment for lawn mowers which may be easily brought into and out of operative connection with the driving shaft which will be driven by the motor of the lawn mower.

It is another object of the invention to provide means whereby the edger may be quickly and easily elevated or lowered so as to edge at the desired elevation or moved to an elevated inactive position when it is desired to use the lawn mower only.

A further object of the invention is to provide in an edger of the character described outer and inner guards for protecting the rotatable cutter blades and which may be readily adjusted to active or inactive positions.

With the above and other objects in view the invention has particular relation to certain novel features of construction, operation and arrangement of parts, an example of which is given in this specification and illustrated in the accompanying drawings, wherein:

Figure 3 is an end elevation.

Figure 4 is an enlarged, sectional view of the edging attachment.

Figure 5 is a perspective view of the cutter bars.

Figure 1:
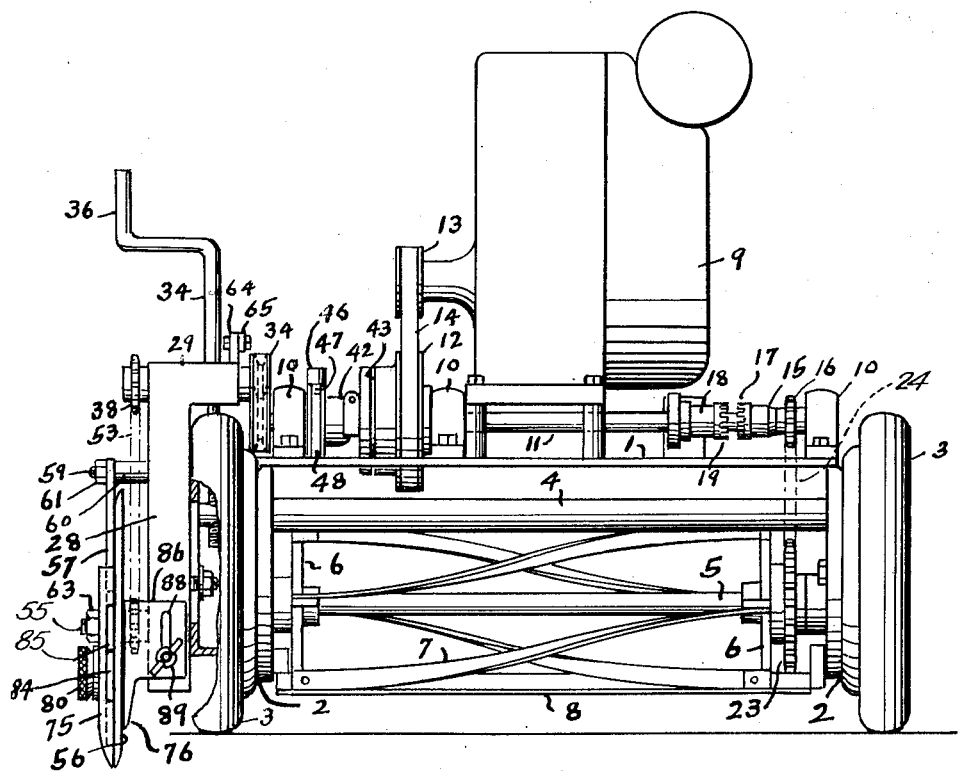
Figure 1 is a front elevation of the complete machine shown partly broken away.
Figure 6:
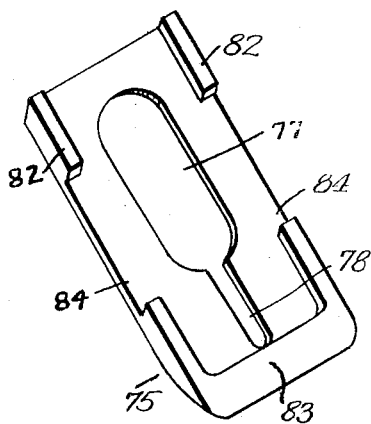
Figure 6 is an inside perspective view of the outer guard.
Figure 7:
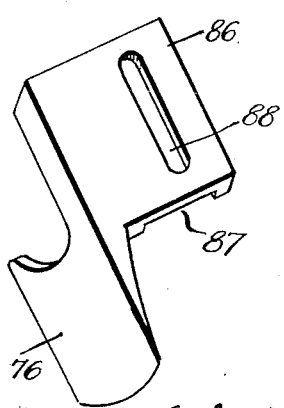
Figure 7 is a perspective view of the inner guard.
Figure 2:
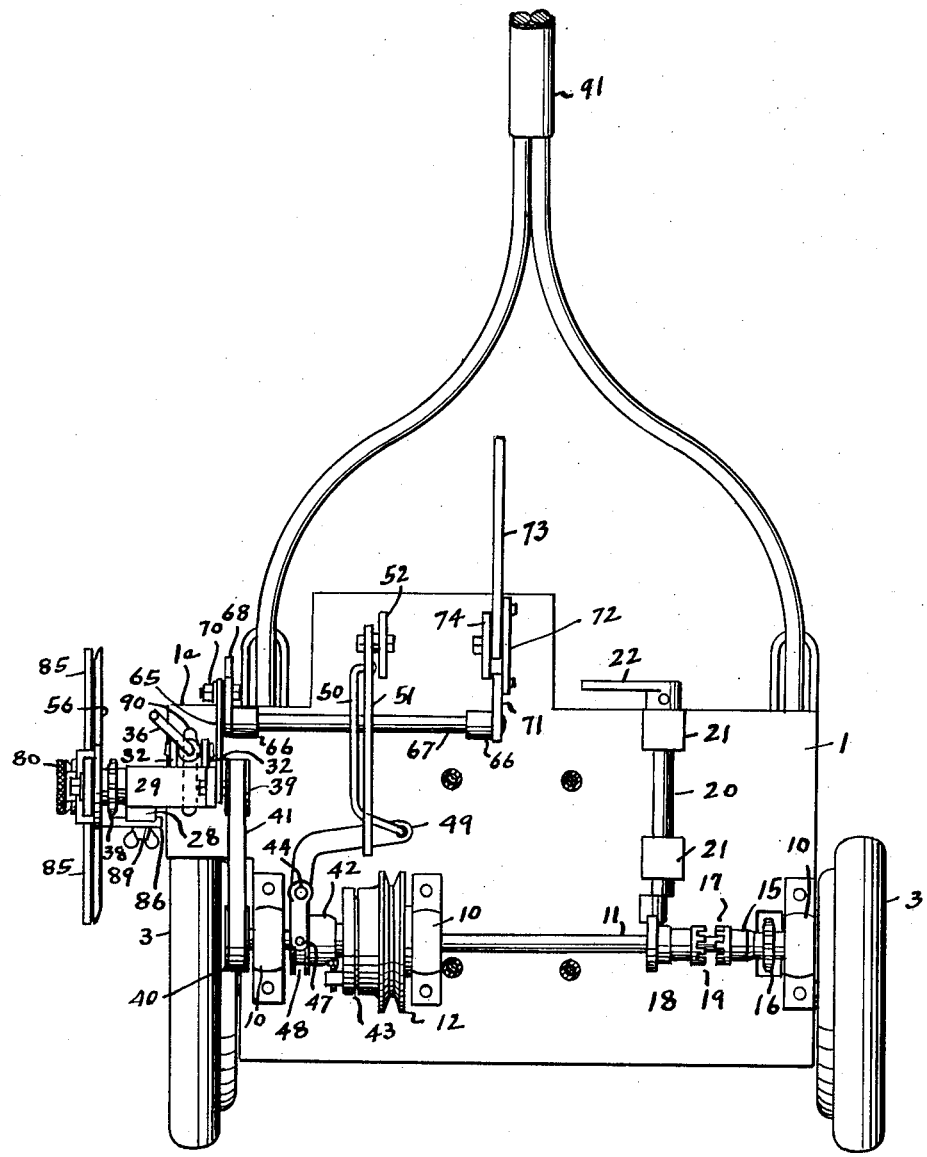
Figure 2 is a partial plan view.

Referring now more particularly to the drawings wherein like numerals of reference designate the same parts in each of the figures, the numeral 1 designates a supporting plate secured to and depending from the ends of which are the discs 2, 2 having suitable spindles on which the ground wheels 3, 3 are mounted to rotate. The discs may be further anchored in spaced relation by means of the transverse bar 4 to whose ends the discs are anchored, said plate 1, discs 2 and bar 4 forming the main framework. There is the conventional cutter blade shaft 5 mounted to rotate in suitable bearings in the discs 2 having the end spiders 6, 6 fixed thereon to which the spiralled cutter blades 7 are connected. These cutter blades co-operate with the fixed cutter bar, or knife, 8 in the usual way, the ends of said bar, or knife, being fixed to the discs 2.

In the present illustration there is a motor 9 suitably supported on the framework and mounted to rotate in transversely aligned bearings 10 on the framework there is a main drive shaft 11 which has a sheave 12 loosely mounted thereon. On the motor shaft there is a sheave 13 which is in alignment with the sheave 12 and operating over these sheaves there is a belt 14 by means of which the sheave 12 and shaft 11 are driven from the motor.

Loosely mounted on the shaft 11 there is a clutch member 15 on one end of which there is fixed a sprocket wheel 16 and whose other end is formed with clutch teeth 17.

Keyed on the shaft 11 there is a clutch member 18 having the jaw clutch teeth 19 thereon adapted to be shifted into and out of intermeshing relation with the jaw teeth 17. This clutch member 18 may be shifted into and out of clutching relation with the clutch member 15 by means of a shaft 20 mounted in bearings 21 on the framework and one end of which has an eccentric connection with the clutch member 18 and the other end of which is provided with a handle 22 whereby the shaft 20 may be turned.

Fixed on the shaft 5 there is a sprocket wheel 23 which is aligned with the sprocket wheel 16 and operating over these sprocket wheels there is a sprocket chain 24 through which the cutter shaft 5 and the cutter blades may be rotated in the conventional manner.

At the opposite end of the framework the plate 1 is reduced in width forming an extension 1a located to the rear of the corresponding ground wheel 3 and depending from the respective ends of the plate 1 are the bars, as 25.

Secured to the free margin of the extension 1a, preferably by welding, and depending therefrom there is an angle plate 26 whose lower end is turned inwardly and secured to the corresponding bar 25, preferably by welding, as is clearly shown in Figure 4. This angle plate 26 is provided with a vertical slot 27 therethrough.

Adjacent the outer side of the angle plate there is a frame consisting essentially of an upright bar 28 whose upper end 29 is inwardly turned. A stud bolt 30 is fixed to the bar 28 and extends inwardly through the slot 27 and is threaded to receive a clamp nut 31. The frame above described may thus be elevated or lowered or pivoted relative to the angle plate 26.

Fixed on the rear side of the inwardly turned end 29 of the frame there are the spaced lugs 32, 32 and mounted to rotate between them there is a spool shaped bearing member 33. A vertical shaft 34 extends through and has swivelling connection with the bearing member 33 which is rotatably mounted between the lugs 32.

Mounted on the inner side of the angle plate 26 and having a rotatable connection therewith there is an internally threaded nut 35. The lower end of the shaft 34 is threaded through this nut and the upper end of said shaft 34 is formed with a crank 36 whereby the shaft 34 may be turned. Upon rotation of said shaft the frame 28, 29 and the appendants thereon, may be adjusted vertically at the will of the operator so as to suitably adjust the edging mechanism, hereinafter referred to, or to elevate it in inactive position.

Mounted to rotate in the overturned end 29 of the frame there is a shaft 37 and fixed on the outer end of said shaft there is a sprocket wheel 38 while fixed on the inner end of the shaft 37 there is a pulley 39.

Aligned with the pulley 39 and fixed on the corresponding end of the shaft 11 there is a pulley 40 and operating the pulleys 39 and 40 and transmitting rotation from the latter to the former there is a belt 41.

Splined on the shaft 11 there is a friction clutch member 42 and fastened to the facing side of the sheave 12 there is a friction clutch member 43. Upstanding from the framework there is a post 44 and mounted to rotate on this post there is a hub 45. Extended forwardly from the upper end of the hub 45 there is an arm 46 having a depending finger 47 which works in said annular groove 48 around the clutch member 42. Fixed to and extending rearwardly from the hub 45 there is an arm 49 whose rear end is inwardly turned and the forward end of a link 50 is connected to the inwardly turned end of the arm 49 and the rear end of this link is connected to a hand lever 51 which is pivotally mounted on an upstanding lug 52 mounted on the plate 1.

By actuating the lever 51 rearwardly a rearward pull may be exerted on the overturned end of the arm 49 which will operate to engage the clutch member 42 with the clutch member 43 and said clutch member 42 being splined on the shaft 11 said shaft will thereby be rotated thus imparting rotation through the sheave 40, the belt 41 and the sheave 39 to the shaft 37 and the sprocket wheel 38.

A sprocket chain 53 operates over, and is driven by, the sprocket wheel 38 and this chain 53 also operates over, and drives a sprocket wheel 54 which is keyed on the outwardly extended shaft 55. The inner end of this shaft 55 is mounted to rotate in the lower end of the upright bar 28 of said frame and fixed on the outer end of said shaft 55 there is a cutter which, in the present illustration, comprises the opositely disposed cutter blades 56, 56.

Adjacent the outer side of said cutter there is a cross-shaped reinforcing plate 57 whose upper end is provided with an opening 58 through which the pin 59 extends. This pin extends outwardly from an enlarged post 60 which is secured to the upright bar 28. The outer end of the pin 59 is threaded to receive a clamp nut 61 by means of which the upper end of the plate 57 is clamped against the outer end of the post 60.

The plate 57 is provided with an opening 62 to receive the outer end of the shaft 55 and a clamp nut 63 is threaded onto the outer end of the shaft 55 and extends through the opening 62 and clamps the cutter between the nut 63 and the sprocket wheel 54.

Accordingly the rotation of the shaft 37 will be transmitted through the chain 53 to the cutter.

Upstanding from the inner end of the overturned portion 29 of the frame there is a lug 64. The forward end of a link 65 is pivoted to the upper end of this lug. Mounted to rotate in suitable transversely aligned bearings 66, 66 and upstanding from the plate 1 there is a transverse shaft 67. Fixed to the outer end there is an arm 68 having a longitudinal slot 69 therein. The rear end of the link 65 may be pivotally and adjustably connected to the arm 68 by means of a suitable clamp bolt 70.

Fixed to the other end of the shaft 67 there is an arm 71 and the forward end of a link 72 is pivotally connected to the upper end of this arm. The other end of the link 72 is pivotally connected to a lever 73 which is pivotally mounted on a lug 74 which upstands from the plate 1. Accordingly, by shifting the lever 73 the shaft 67 may be rotated and the link 65 correspondingly oscillated and this will operate to swing the frame 28, 29 about its pivotal support on the angle plate 26.

When the upper end of this frame is swung forwardly slack will be created in the belt 41 and the rotation of the cutter will be stopped. When desired to impart rotation to said cutter the frame may be swung rearwardly to take the slack out of the belt 41 so that rotation will be imparted from the sheave 40 to the sheave 39 and thence to the shaft 37 and the cutter.

While the edger is in operation it is obvious that if it be desired to render the mower inoperative, that is to stop the rotation of the blades 7 the clutch member 18 may be declutched from the clutch member 15 in the manner hereinabove explained.

As heretofore indicated the cutter is provided with the outer guard 75 and the inner guard 76. The outer guard is provided with an elongated approximately elliptical slot 77 to receive the clamp nut 63 and extended downwardly from the slot 77 there is a narrow slot 78 through which the outwardly threaded pin 79, fixed to the plate 57, extends and a clamp nut 80 is threaded onto this pin 79 and is provided to clamp the outer guard 75 against the plate 57. To maintain the parts properly aligned there is a stud 81 which projects outwardly from the plate 57 into the slot 78, as shown in Figure 4.

The outer guard 75 has marginal side flanges 82 on its inner side and the transverse lower end flange 83 across its lower end; said flanges fitting against the outer side of the cutter and the side flanges 82 are formed with the notches 84, 84 through which the oppositely extending cutter bars 85 of the plate 57 extend; said cutter bars 85 being substantially narrower than the notches 84 to allow vertical adjustment of the guard 75.

The inner guard 76 fits closely against the inner side of the cutter, as shown in Figure 4. At its upper end it is provided with an inwardly extended wing 86 which fits closely against the forward side of the bar 28 and said wing is formed with a shallow inside groove 87 to snugly receive said bar. The wing 86 is formed with a vertical slot 88. A stud bolt 89 is anchored to the bar 28 and extends forwardly through the slot 88 and its outer end is threaded to receive a clamp nut 89 whereby the inner guard 76 may be secured to said bar 28. By loosening the clamp nut 89 said inner guard may be adjusted vertically as desired.

In edging should the side walk or curb be located on the outer side of the cutter the clamp nut 80 may be loosened and the outer guard 75 adjusted downwardly and the nut 89 may be loosened and the inner guard 76 adjusted upwardly as illustrated in Figure 1 and said clamp nuts then tightened to maintain said guards in said adjusted positions; on the other hand should the side walk, or curb, along which the edging is being done be on the inner side of the cutter the inner guard may be adjusted downwardly and the outer guard adjusted upwardly as above explained. The cutter will thus be protected from coming into direct contact with the curb, or side walk, and this is very desirable since the cutter rotates at a high rate of speed and would be substantially injured by coming into contact with hard metal.

The bars 85 co-act with the cutter blades 56 with shear-like effect for cutting grass that is unusually high.

In elevating and lowering the edger attachment by rotating the shaft 34 the stud bolt 30 acts as a guide, moving along the slot 27 in the angle plate 26.

In order that the edger frame and the appendants thereof may be moved forwardly or rearwardly to impart slack or tension to the belt 41 the extension 1a of the plate 1 is provided with a slot 90 along with said shaft 34 may move.

The machine may be propelled forwardly by a push bar, or handle, 91 suitably connected, in any conventional manner, to the framework and the machine is stabilized in its movements by means of a suitable supporting roller 92 having end pintles which work in suitable bearings of the framework.

The drawings and description are illustrative merely while the broad principle of the invention will be defined by the appended claims.

What I claim is:

1. An edger comprising, a frame adapted to rotate about a horizontal axis on a portable framework, a cutter mounted to rotate on a horizontal axis on the frame and means on the frame for driving the cutter said frame, cutter and driving means being adjustable as a unit relative to the framework.

2. An edger for lawns comprising, a portable framework, a frame pivoted to rotate about a horizontal axis on the framework, a cutter mounted to rotate on a horizontal axis on the frame, means on the frame for driving the cutter, means on the framework operatively connected with said driving means for driving the latter said means, connected with the driving means, being rendered inoperative by partial rotation of the frame about its axis.

3. An edger for lawns and the like comprising, a portable framework, a frame pivoted to rotate about a horizontal axis on the framework, means for adjusting the frame vertically relative to the framework, a cutter mounted to rotate on a horizontal axis on the frame and means on the frame for driving the cutter.

4. A lawn edger comprising, a portable framework, a frame pivoted to rotate about a horizontal axis on the framework, means for adjusting the frame vertically relative to the framework, a cutter mounted to rotate on a horizontal axis on the frame, means on the frame for driving the cutter and means on the framework operatively connected with said driving means for driving the latter.

5. An edger of the character described comprising, a portable framework, a frame pivoted to rotate about a horizontal axis on the framework, a nut mounted to swivel on the framework, a shaft having a swivelling connection with the frame and a threaded connection with said nut whereby the frame may be adjusted vertically relative to the framework, a cutter mounted to rotate on a horizontal axis on the frame and means on the frame for driving the cutter.

6. An edger of the character described comprising, a portable framework, a frame pivoted to rotate about a horizontal axis on the framework, a cutter mounted to rotate on a horizontal axis on the frame, means on the frame for driving the cutter, driving means on the framework, means for operatively connecting said driving means on the framework and frame, respectively, said connecting means being arranged to be rendered inoperative upon movement of the frame about its pivot in one direction and to be rendered operative upon movement of the frame about its pivot in the other direction.

7. An edger of the character described, comprising, a frame adapted to be mounted on a portable framework to pivot about a horizontal axis, a cutter mounted to rotate on a horizontal axis on the frame, means on the frame for driving the cutter, a vertically adjustable outer guard arranged adjacent the outer side of the cutter.

8. An edger of the character described comprising, a frame adapted to be mounted on a portable framework to pivot about a horizontal axis, a cutter mounted to rotate on a horizontal axis on the frame, means on the frame for driving the cutter, a vertically adjustable inner guard arranged adjacent the inner side of the cutter.

9. An edger of the character described comprising, a portable framework, a frame pivoted to rotate about a horizontal axis on the framework, a cutter mounted to rotate on the horizontal axis on the frame, means on the frame for driving the cutter, means on the framework operatively connected with said driving means for driving the latter, vertically adjustable cutter guards adjacent the outer and inner sides of the cutter, respectively and means for adjusting said guards independently.

10. An edger of the character described comprising, a portable framework, a side frame mounted on the framework, a cutter mounted to rotate on a horizontal axis on the frame, means on the frame for driving the cutter, means on the framework operatively connected with said driving means for driving the latter, cutter guards on the frame adjacent the outer and inner sides of the cutter, respectively, the outer guard being adjustable vertically on the frame.

11. An edger of the character described comprising, a portable framework, a frame, a cutter mounted to rotate on a horizontal axis on the frame, means on the frame for driving the cutter, vertically adjustable cutter guards on the frame adjacent the outer and inner sides of the cutter, respectively, means for adjusting said guards vertically independent of each other, said frame and the appendants thereon being mounted to pivot on a horizontal axis on the framework as a unit.

12. An edger of the character described comprising, a portable framework, a frame, a cutter mounted to rotate on a horizontal axis on the frame, means on the frame for driving the cutter, vertically adjustable cutter guards on the frame adjacent the outer and inner sides of the cutter, respectively, means for adjusting said guards vertically independent of each other, said frame and the appendants thereon being mounted to pivot on a horizontal axis on the framework as a unit, means on the framework operatively connected with said driving means when the frame is adjusted to one position and disconnected therefrom when the frame is adjusted to another position.

SALVATORE VELOTTA.

REFERENCES CITED

The following references are of record in the file of this patent:

UNITED STATES PATENTS

| Number | Name | Date |
|---|---|---|
| 431,836 | Bockus | July 8, 1890 |
| 1,054,320 | Slatter | Feb. 25, 1913 |
| 1,065,946 | Janson | July 1, 1913 |
| 1,858,031 | Bennet et al. | May 10, 1932 |
| 2,158,580 | Houser | May 16, 1939 |